(12) United States Patent  (10) Patent No.: US 9,110,950 B2
Barsoba et al.  (45) Date of Patent: *Aug. 18, 2015

(54) EXPERT LOCATOR BASED ON USER POLLING

(71) Applicant: International Business Machines Corporation, Armonk, NY (US)

(72) Inventors: Fernando Barsoba, Durham, NC (US); David T. Britt, Greensboro, NC (US); Al Chakra, Apex, NC (US); Xiu-Feng Lin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,971

(22) Filed: Jul. 18, 2014

(65) Prior Publication Data

US 2014/0337380 A1 Nov. 13, 2014

Related U.S. Application Data

(63) Continuation of application No. 12/649,271, filed on Dec. 29, 2009.

(51) Int. Cl.
*G06Q 10/00* (2012.01)
*G06F 17/30* (2006.01)
*G06Q 10/06* (2012.01)
*G06Q 50/00* (2012.01)

(52) U.S. Cl.
CPC .......... *G06F 17/30477* (2013.01); *G06Q 10/00* (2013.01); *G06Q 10/06* (2013.01); *G06Q 10/063112* (2013.01); *G06Q 50/01* (2013.01)

(58) Field of Classification Search
USPC .................................................. 705/320, 321
See application file for complete search history.

(56) References Cited

U.S. PATENT DOCUMENTS

| | | | |
|---|---|---|---|
| 2003/0004909 A1* | 1/2003 | Chauhan et al. | 706/45 |
| 2003/0229529 A1 | 12/2003 | Mui et al. | |
| 2004/0205065 A1 | 10/2004 | Petras et al. | |
| 2005/0027612 A1* | 2/2005 | Walker et al. | 705/26 |
| 2005/0043940 A1 | 2/2005 | Elder | |
| 2005/0137976 A1* | 6/2005 | Anderson et al. | 705/40 |
| 2006/0004601 A1 | 1/2006 | Marks | |
| 2006/0259922 A1 | 11/2006 | Sandgren et al. | |

(Continued)

OTHER PUBLICATIONS

Hughes et al.; Ttl: Experiences in Designing Highly Adaptable Expertise Finder Systems; Conf. Ttl: 2003 ASME Design Engineering Technical Conferences and Computer and Information in Engineering Conference; 2003; Publisher: American Society of Mechanical Engineers; Database: Ei Compendex(R); E.I. Compendex No. 2004178135570.

(Continued)

*Primary Examiner* — Gabrielle McCormick
(74) *Attorney, Agent, or Firm* — Patterson & Sheridan, LLP

(57) ABSTRACT

According to one embodiment of the present invention, a method for locating experts is provided. The method includes receiving a first query from a first user requesting the identity of persons having desired skills. The names of persons in a database having the desired skills are then identified. A second query is sent to a plurality of additional users requesting the verification of the information relating to the skills of the identified persons. Responses from the plurality of users are used to amend the information relating to skills of the identified persons.

20 Claims, 3 Drawing Sheets

(56) References Cited

U.S. PATENT DOCUMENTS

| | | | |
|---|---|---|---|
| 2007/0168345 A1 | 7/2007 | Gibbs et al. | |
| 2007/0208575 A1* | 9/2007 | Habichler et al. | 705/1 |
| 2008/0046520 A1 | 2/2008 | Jager et al. | |
| 2008/0077461 A1 | 3/2008 | Glick | |
| 2008/0243581 A1* | 10/2008 | Jennings | 705/9 |
| 2008/0301563 A1 | 12/2008 | Bellamy et al. | |
| 2009/0171726 A1 | 7/2009 | Johnson et al. | |
| 2011/0161129 A1 | 6/2011 | Barsoba et al. | |

OTHER PUBLICATIONS

Gliozzo et al; Ttl: A Collaborative Semantic Web Layer to Enhance Legacy Systems; Conf. Ttl: 6th International Semantic Web Conference, ISWC 2007 and 2nd Asian Semantic Web Conference, ASWC 2007; 2007; Publisher: Springer Verlag; Database: Ei Compendex(R); E.I. Compendex No. 20083511485078.

Irma Becerra-Fernandez, "Searching for Experts on the Web: A review of Contemporary Expertise Locator Systems", ACM Trans. on Internet Tech., vol. 6, No. 4, Nov. 2006, pp. 333-355.

"AskMe Solutions: Enterprise Knowledge Networking that Empowers Knowledge Workers," Realcom US Inc., 2009: pp. 1-2, <http://www.realcom-inc.com/productl>.

Karl M. Wiig, "Knowledge Management Foundations," Arlington, Schema Press, 1993: pp. Table of Contents, 1-32, 74-85,116-123,140-145 and 160-167 (37 pages).

* cited by examiner

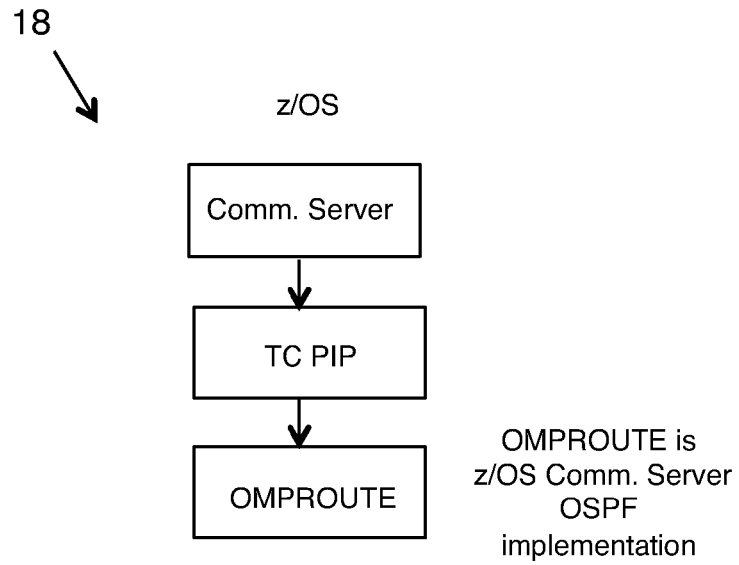
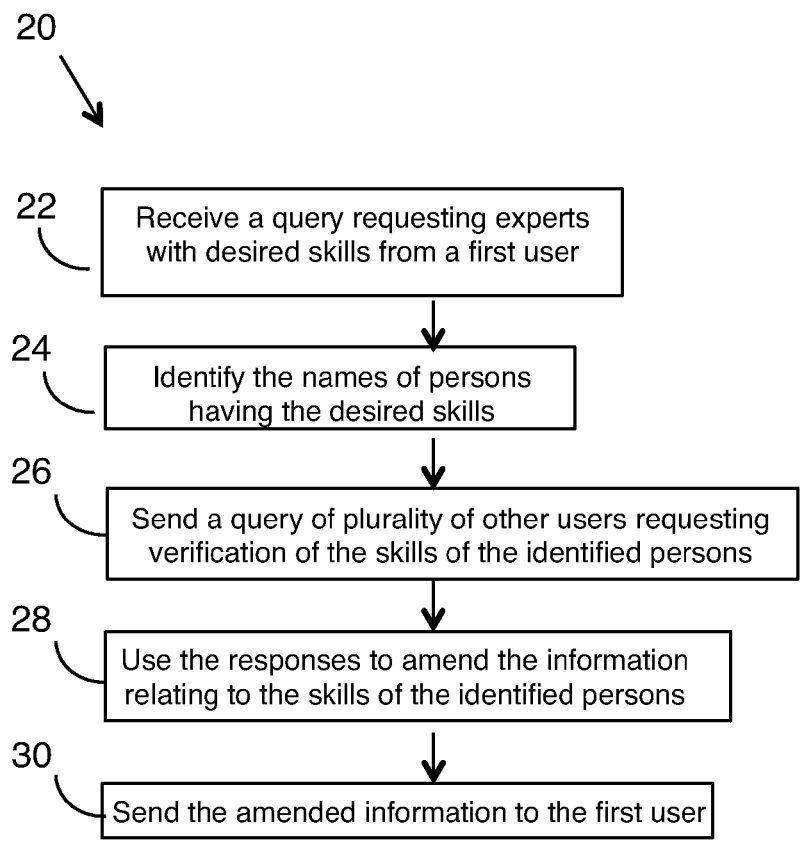

EXPERT LOCATOR BASED ON USER POLLING

CROSS-REFERENCE TO RELATED APPLICATIONS

This application is a continuation of co-pending U.S. patent application Ser. No. 12/649,271, filed Dec. 29, 2009. The aforementioned related patent application is herein incorporated by reference in its entirety.

BACKGROUND

The present invention relates to knowledge management systems (KMS), and more specifically, to an expert locator based on user polling.

There are currently KMS solutions that provide some form of expert location. For example, the AskMe solution provided by Realcom (http://www.realcom-inc.com/product/) has an expert locator. AskMe uses collaboration to identify experts for particular areas of knowledge, implementing expert profiles to manage human sources of area-specific knowledge. These profiles can be updated dynamically by the experts themselves or may be automatically updated through processes which monitor information published by the expert.

SUMMARY

According to one embodiment of the present invention, a method includes receiving a first query from a first user requesting the identity of persons having desired skills. The names of persons in a database having the desired skills are then identified. A second query is sent to a plurality of additional users requesting the verification of the information relating to the skills of the identified persons. Responses from the plurality of users are used to amend the information relating to skills of the identified persons. According to another embodiment of the invention, a computer program product is provided for implementing this method.

According to a further embodiment of the present invention, a system includes a semantic layer for receiving a query from a source, where the query is seeking the names of persons with a particular skill set. The system also includes a knowledge management system (KMS) layer for representing a body of knowledge. A collaboration layer is also included for disseminating the query to at least one user in a social network for the purpose of soliciting responses to the query and for the purpose of verifying the responses.

BRIEF DESCRIPTION OF THE SEVERAL VIEWS OF THE DRAWINGS

FIG. 2 shows a diagram of knowledge representation in the KMS layer of the expert locator system shown in FIG. 1 in accordance with an embodiment of the invention;

FIG. 4 shows a flowchart of a process for locating expert in accordance with an embodiment of the invention.

DETAILED DESCRIPTION

Figure 1:
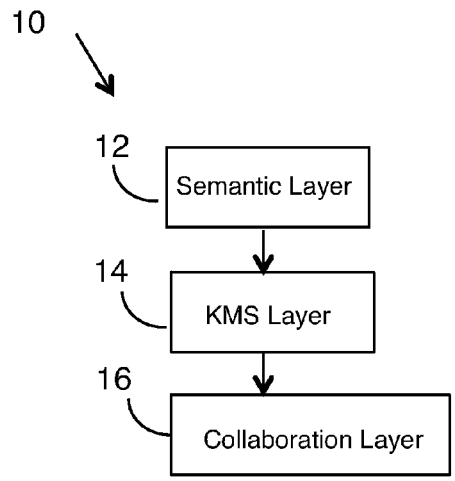
FIG. 1 shows a diagram of an expert locator system in accordance with an embodiment of the invention.

Embodiments of the invention provide systems, methods and computer program products for the collection and harnessing of knowledge by polling user communities for information on the skill levels and expertise of subject matter experts. Embodiments of the system of the present invention use a variety of layers of elements that may include semantic, KMS and collaborative layers to make the knowledge more accurate based on human feedback.

In the aforementioned AskMe solution, although profiles can be updated dynamically (by the experts themselves) or automatically (through processes which monitor information published by the expert), there is no provision for user creation or validation of the expert profiles. In contrast, embodiments of the present invention employ the solicitation of collaborative input directly from the user population to create and validate expert profiles.

An embodiment of the invention will be explained using the example of a software engineer, Alice, who works in ACME company. Alice has been assigned with assembling a task force for a new project. She has to identify the experts that will be part of her team. In order to do this Alice is considering using the department's skills database. Her department periodically (once or twice per year) asks employees to evaluate their abilities and experience by filling out an online survey with a long list of skills. Employees need to look at each of these skills and evaluate themselves as to what is their level of competence (capability level) as well as the level experience acquired in performing such skills.

The classification is similar to Wiig's levels of proficiency classifications as defined in Wiig, K. 1993, "Thinking About Thinking—How People and Organizations create, Represent, and Use Knowledge", Schema Press, Arlington Tex. 1993. These classifications include:

Ignorant—totally unaware,
Beginner—vaguely aware, no experience,
Advanced beginner—aware, relatively unskilled,
Competent—narrowly skilled,
Proficient—knowledgeable in selected areas,
Expert—highly proficient in a particular area, generally knowledgeable,
Master—highly expert in many areas, broadly knowledgeable,
Grand Master—world-class expert in all areas of domain.

Completing the process may take several hours, depending on how dedicated to the task the employee feels that day. Thus, the accuracy of this method is always relative, as employees may not want to fully disclose their expertise to downplay their abilities in order to avoid being selected to perform a certain task. Or they may exaggerate their competencies for fear of being laid-off. In spite of the shortcomings of such method, the results from this survey are later reviewed in several management meetings, and used by upper management to plan ahead in terms of resources and education plans.

Alice ponders that, even though her department's approach to expertise locator systems is a bit rudimentary, the corporate KMS that scours the Intranet for employees' publications and posts does not fare much better. ACME uses a web mining system which draws from an existing pool of information and applies techniques such as linguistic analysis or statistical and co-occurrence analysis, among others. This approach is more advanced than the one Alice's department uses, yet, as described below, it also has its limitations.

Embodiments of the present invention address the problem of helping Alice find the right selection of people for her project. These embodiments include an Expert Locator based on dynamic collaboration and peer voting. In embodiments of the Expert Locator System, users interact with a semantic layer that may include an Artificial Intelligence (AI) engine by providing sentences which translate into natural language and contain information on a person's skill level and experience. These expertise evaluations are stored and distributed to users across the organization. Users will vote on them, providing the feedback that serves the KMS to refine itself and keep on building the knowledge database.

Embodiments of the present invention collect and harness knowledge by polling user communities for information on the skill levels and expertise of subject matter experts (SMEs). This approach differs from existing approaches through its iterative solicitation of user input and ratings to continuously refine the knowledge database. An advantage of this approach includes the ability to more accurately capture tacit knowledge through the interpretation of collaborative human feedback, a significant input not currently incorporated within current expert locator systems.

The expert locator system of the present invention may consist of three main elements that are described herein as layers. FIG. 1 shows a block diagram of the three main components, or layers according to an embodiment of the invention. In particular the expert locator system 10 includes a semantic layer 12, a KMS layer 14 and a collaboration layer 16. The semantic layer 12 may comprise an AI interface that allows users to interact with the system by either requesting evaluations, or by responding to feedback from the lower KMS layer 14. Through query refinement, the semantic layer 12 interprets a user's requests and responses so that they conform to a predetermined format that is understood by the KMS layer 14.

The KMS layer 14 may include a currently available KMS software engine. All the knowledge in the expert locator system 10 may be managed by the KMS layer 14. The KMS layer 14 serves as a middle man to the collaboration layer 16. The collaboration layer 16 gathers information from different user databases, social networks, and any repository that holds data on users and their location, department, category, etc. The three layers are explained in more detail below.

Semantic Layer and Query Refinement

The operation of the expert locator system 10 will be explained using the above-described example of the software engineer named Alice, who works for ACME company. Alice may be looking for someone with skills in the z/OS CommServer implementation of the OSPF routing protocol. Alice will communicate with the expert locator system 10 through "knowledge query" or "knowledge response" commands. A knowledge query/response is a sentence long command with subject and predicate which contains enough information for the system to process and act upon through one or more iterations. Once the query has been refined and accepted by the KMS layer 14, it will be sent to the collaboration layer 16 that handles the distribution of the request to all users and ask them to verify a previous evaluation. The interface that Alice uses to communicate to the KMS layer 14 can be a plug-in to an instant messaging application, such as a Lotus SameTime plug-in.

In this example Alice could generate the following query:
Alice:>"Who knows z/OS OSPF?"

The AI system operating at the semantic layer 12 receives this query and sends a query to the KMS layer 14, which will look for a representation of the piece of knowledge "z/OS OSPF". It can be assumed that the KMS layer 14 would contain a representation of this knowledge, which is shown by the diagram 18 shown in FIG. 2. The semantic layer 12 will use this representation in the KMS layer 14 to generate and return the user a knowledge response sentence such as:

"(?subject) is (?skill level) in [OMROUTE (z/OS.CommServer.TCPIP)] with (?experience level)"

The first iteration in the KMS query refinement is intended to verify what Alice entered. It will build the path that will lead to the actual knowledge. Here the expert locator system 10 is asking Alice if the representation it has of the knowledge is correct. If Alice approves the query, the KMS layer 14 will send out the query past the KMS layer 14 to the collaboration layer 16.

The query refinement is an important step because it creates a way for the expert locator system 10 to communicate with Alice's peers using constructed language. In order to make the expert locator system 10 more user friendly, the semantic layer 12 can operate as it were an instant messenger buddy and inquire about who knows OMROUTE in the organization. In one embodiment, these messages should have to be random (never query twice the same user in a certain time interval) and of limited reach (query only those from certain departments).

For instance, Alice's peer John might receive an initial electronic message from the AI Agent stating:

AI Agent:>"John, Sorry to disturb you. Do you know who knows [OMROUTE (z/OS.CommServer.TCPIP)]?

Here, the AI Agent is initiating a conversation asking for someone that may posses a particular skill. The user who receives this query, John, needs to answer following a predefined rule containing verb+predicate. In our example, John knows two people, Bob and Tom and sends the following reply to the AI Agent, and the following exchange ensues:

---

John:> Bob Jones, Tom Smith knows OMROUTE
AI Agent:> Thank you, John. As per your response Bob Jones/ Raleigh/IBM
(TCPIP Support) and Tom Smith/Raleigh/IBM (TCPIP Development) knows [OMROUTE.(z/OS.CommServer.TCPIP)]
AI Agent:> Could you please indicate the skill level and experience? (hint: Proficient/very experienced)?
John:> Bob is proficient and very experienced. Tom is competent and experienced.
AI Agent:> Thank you, John. As per your response:
BobJones/Raleigh/IBM(TCPIPSupport) is proficient in [OMROUTE.(z/OS.CommServer.TCPIP)] and experience=very experienced.
Tom Smith/Raleigh/IBM (TCPIP Development) is competent in [OMROUTE.(z/OS.CommServer.TCPIP)] with experience= experienced.
AI Agent:> Please John, confirm your evaluation.
John:> Confirmed
AI Agent:> Thank you for your evaluation, John.

---

The above example illustrates how a typical exchange between the AI Agent and John might occur. John knows which words the AI Agent will understand (the 'confirmed' word, the levels of competencies and experience such as 'proficient' and 'very experienced', etc). If the AI Agent does not understand some of John's responses, it will try to refine the query, and give John another opportunity to answer in a way the AI Agent understands. John can always close the instant messenger window and the AI Agent will not try to query John for a certain period of time.

KMS Layer

As indicated previously, the function of the KMS layer 14 might be provided by any external Knowledge Management System available in the market. Examples of such KMS systems that may be employed with the present invention are discussed in Becerra-Fernandez, "Searching for experts on the Web: A review of contemporary expertise locator systems," *ACM Trans. Internet Technol.*, vol. 6, 2006, pp. 333-355, which is incorporated herein by reference.

Collaboration Layer and Voting Mechanism

One advantage of the expert locator system 10 is that once it has an initial classification, it may build on that knowledge database by asking the same question to many users. In order to do that the KMS layer 14 draws from any social network that the company may use. Using this social network, the KMS layer 14 may query people related to Bob Jones and Tom Smith who may not necessarily be in the same department or even in the same business unit.

Figure 3:
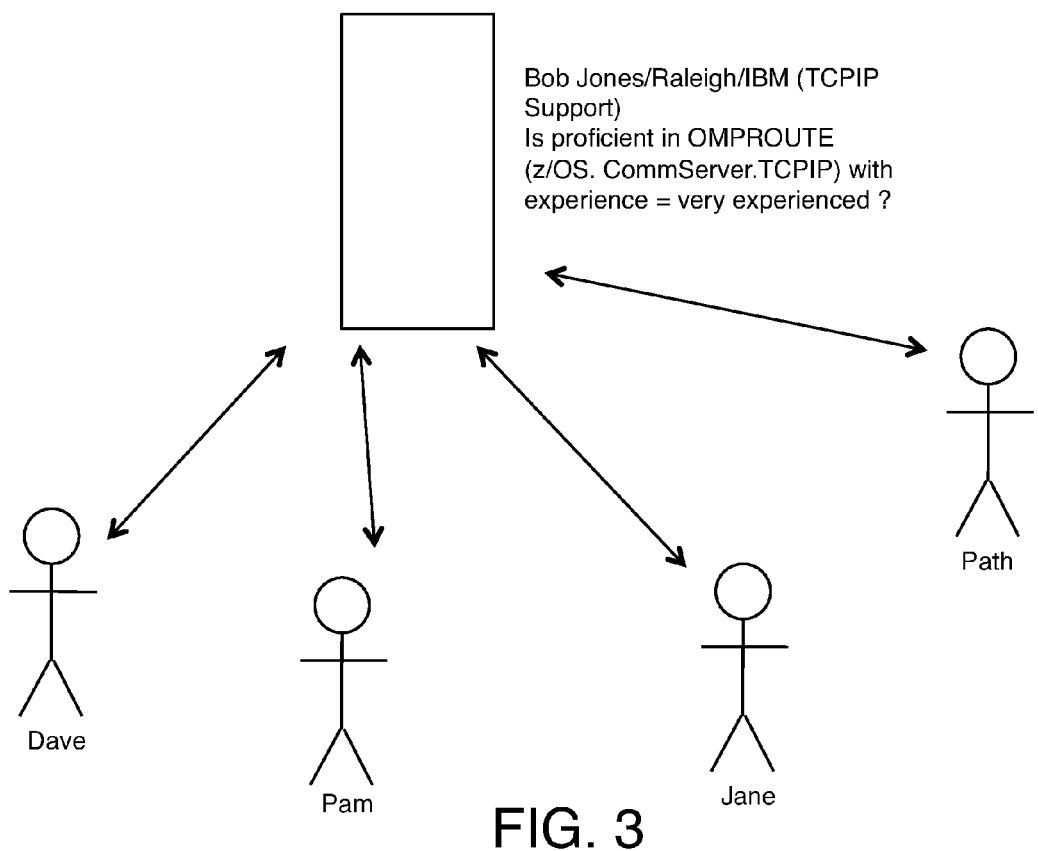
FIG. 3 shows a diagram of the dissemination of a query to users in a social network by the expert locator system shown in FIG. 1 in accordance with an embodiment of the invention.

FIG. 3 shows a diagram of the dissemination of a query to users in a social network by the expert locator system 10 in accordance with an embodiment of the invention. In the process shown in FIG. 3, the KMS layer 14 will establish a conversation similar to the one mentioned above. In that context, users (Dave, Pam, etc) may be asked by the expert locator system 10 to evaluate Bob Jone's skill and experience. For example, Dave may not feel that Bob's experience is equal to "very experienced". He can downgrade the rating assigned to Bob to just "experienced", and the same may happen with the rest of Bob's peers.

Through several iterations, the KMS layer 14 may start to build a reasonably accurate classification and evaluation of all the employees of the ACME company. Now Alice is ready to query the KMS layer 14 about any other of her peers and decide who has the right skills to participate in her taskforce.

FIG. 4 shows a flowchart of a process 20 for locating experts in accordance with an embodiment of the invention. In step 22, a query is received by the semantic layer 12 from a first user requesting the names of persons with desired skills. The KMS layer 12 is used to identify the names of persons with the desired skills, in step 24. In step 26, a query is sent to a plurality of users in a social network requesting the verification of the skills of the identified persons. In step 28, the responses from the users in the social network are used to amend the information relating the skills of the identified persons. In step 30, the amended information is sent to the first user. The process of sending the query to the persons in the social network and amending the information may be performed iteratively until a desired level of statistical data is collected on the skill levels of the identified persons.

There are a number of advantages of the collaboration-based expert locator system 10 versus traditional KMS systems. One advantage relates to the issue of the disparity between system design and system use. Development of the information fed into a KMS is often done outside of the user population for which the information is intended. This approach has a propensity for populating a KMS with information that is less useful or not needed. The present invention has an advantage because both the content and the validity of the information are derived directly from the intended user population, increasing the likelihood that the resulting system will meet the needs of the users.

Another advantage of the present invention is in the area of critical mass. In general, this kind of system is more successful if a high number of users interact with the system. In a traditional KMS, the knowledge base may be developed by a specific team or a subset of the user population. Conversely, with the expert system locator of the present invention, the system will "learn" about users and their skills from the entire user population, and it will continually update itself through regular use, making the system more accurate.

Another advantage of the present invention relates to its minimal disruption of social processes. Any tool developed (groupware applications) has to align with the implicit social, motivational, economic, and political factors of the organization. Many existing KMS implementations require proprietary client software by which users access the knowledge base. In contrast to this, the present invention uses chat-like interactions which can be integrated into a company's existing client chat applications, making the changes less obtrusive to the users' daily routines.

A further advantage relates to the ability for dynamic growth of the knowledge database. Today's KMS are sometimes based upon rigid databases which store knowledge from the perspective of the system designer. A dynamic, collaboration-based system, such as the present invention, is more flexible in introducing new types of knowledge (updating the semantic and KMS layers) that will allow the semantic layer to develop based on usage, and will maintain data based on continually changing user feedback.

As can be seen from the above disclosure, embodiments of the invention provide an expert locator system that is based on user polling. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
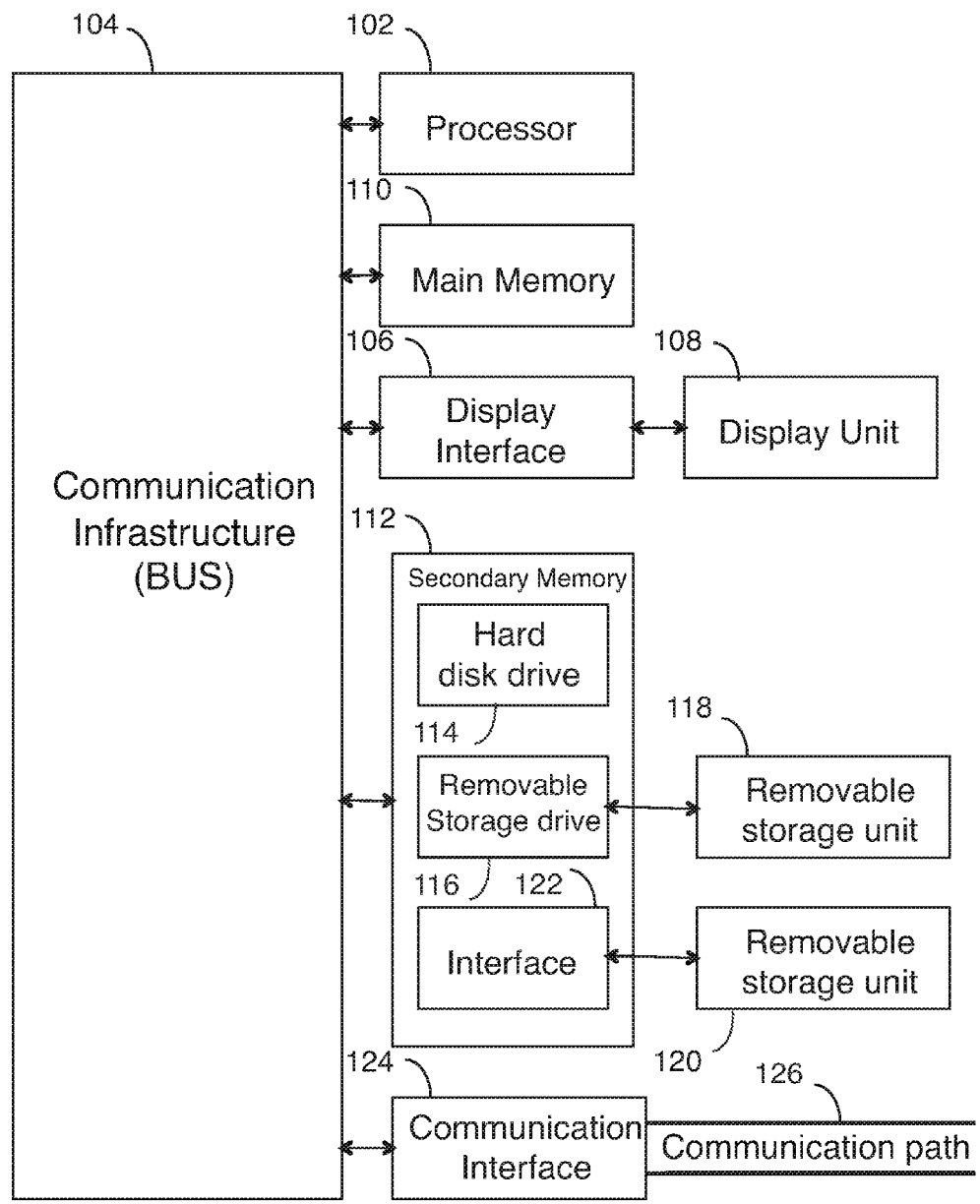
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method to determine individuals having target skills, the computer-implemented method comprising:
    receiving, by an application and from a requesting entity, a request to identify individuals having a target skill specified in the request, wherein the application includes a first layer representing a body of knowledge in a data store, wherein the request comprises a query composed according to a query language not supported by the first layer;
    reformulating the query into a different query language supported by the first layer;
    identifying, by accessing the data store using the reformulated query: (i) a first individual having the specified skill and (ii) a first characterization of a skill level of the first individual in the specified skill, wherein the first characterization is stored in the data store and is determined based on input from a plurality of individuals; and
    upon determining, by operation of one or more computer processors, that a count of the plurality of individuals is less than a predefined count of individuals characterizing the skill level of the first individual, confirming the skill level of the first individual by requesting at least a second individual to provide a second characterization of the skill level of the first individual in the specified skill, wherein the second individual is not included in the plurality of individuals.

2. The computer-implemented method of claim 1, further comprising using a knowledge management system (KMS) to identify names of individuals in the data store having the target skill.

3. The computer-implemented method of claim 1, wherein the first query is reformulated by a semantic software component of the application, wherein the reformulated query has a predetermined syntax.

4. The computer-implemented method of claim 3, further comprising:
    sending the reformulated query to the requesting entity; and
    verifying with the requesting entity that the reformulated query is a correct representation of the query.

5. The computer-implemented method of claim 1, wherein the first layer comprises a knowledge management system (KMS) layer, wherein the computer-implemented method further comprises:
    receiving the query in a semantic software component; and
    using the KMS layer to refine and accept the query.

6. The computer-implemented method of claim 1, further comprising:
    upon programmatically determining that the second characterization confirms the first characterization of the skill level of the first individual in the specified skill, generating output identifying the first individual and specifying the confirmed first characterization of the skill level of the first individual in the specified skill, wherein the output is returned to the requesting entity responsive to the request; and
    upon programmatically determining that the second characterization is different from the first characterization, determining a refined characterization of the skill level of the first individual in the specified skill, based on the second characterization, wherein the refined characterization is different from the first characterization, wherein the data store is updated to reflect the refined characterization of the skill level of the first individual in the specified skill, wherein the refined characterization is output to the requesting entity responsive to the request.

7. The computer-implemented method of claim 6, wherein the first layer comprises a knowledge management system (KMS) layer, wherein the application further includes a semantic layer and a collaboration layer, wherein the semantic layer includes an Artificial Intelligence (AI) engine configured to programmatically interact with one or more individuals via instant messaging to request and receive input characterizing the skill level of the first individual in the specified skill, wherein the semantic layer further includes an interface implemented as a plug-in to an instant messaging application;
    wherein the query is reformulated by the AI engine, wherein the first query is received by the semantic layer.

8. The computer-implemented method of claim 7, wherein the first individual is identified by the KMS layer, wherein the second individual belongs to a social network, wherein the social network includes a third individual, wherein the refined characterization is determined based further on at least one of: (i) a third characterization of the skill level of the first individual in the specified skill, wherein the third characterization is provided by the third individual and confirms the second characterization of the skill level of the first individual and (ii) the third characterization being different from the first characterization and the second characterization, wherein the first individual is selected from a set of individuals identified to be part of a predetermined organization, wherein the data store comprises a database;

wherein the second characterization from the second individual is requested and received by the collaboration layer, wherein the computer-implemented method further comprises, by the semantic layer:

receiving, from the requesting entity, input responsive to prompting the requesting entity to verify that the reformulated query is a correct representation of the first query;

upon determining that the input received from the requesting entity indicates that the reformulated query is a correct representation of the first query, submitting the reformulated query to the KMS for refinement.

9. The computer-implemented method of claim 8, further comprising:

upon determining that the count of the plurality of individuals is equal to or greater than a predefined count of individuals characterizing the skill level of the first individual, generating output identifying the first individual and specifying the confirmed first characterization of the skill level of the first individual in the specified skill, without requesting any additional individual, including the second individual, to characterize the skill level of the first individual, wherein the output is returned to the requesting entity responsive to the request;

wherein the plurality of individuals are distinct, wherein the first characterization of a skill level of the first individual in the specified skill is not determined based on any input from the first individual, wherein the first individual is not requested to characterize the skill level of the first individual in the specified skill.

10. The computer-implemented method of claim 9, wherein the count of the plurality of individuals characterizing the skill level of the first individual is identified by accessing the data store, wherein the count is incremented upon receiving the second characterization from the second individual, wherein the count is not incremented upon determining that the plurality of individuals is, in number, equal to or greater than the predefined count of individuals characterizing the skill level of the first individual;

wherein requesting at least the second individual to provide a second characterization comprises:

requesting one or more individuals, including the second individual, to characterize the skill level of the first individual, such that: (i) a sum of: (A) a count of the one or more individuals and (B) the count of the plurality of individuals equals the predefined count of individuals; and (ii) a final characterization of the skill level of the first individual in the specified skill is programmatically determined, such that no individual beyond the predefined count of individuals is requested to characterize the skill level of the first individual and such that the final characterization is not subsequently modified based on input from any individual.

11. The computer-implemented method of claim 10, wherein the first characterization of the skill level of the first individual in the specified skill is determined by:

requesting a fourth individual to specify one or more individuals having the specified skill;

receiving, from the fourth individual, an indication that the first individual has the specified skill;

requesting the fourth individual to characterize the skill level of the first individual in the specified skill;

receiving, from the fourth individual, a fourth characterization of the skill level of the first individual in the specified skill;

requesting a fifth individual whether the fourth characterization accurately describes the skill level of the first individual in the specified skill; and programmatically determining the first characterization based on the fourth characterization and a fifth characterization received from the fifth individual, wherein the first characterization matches the fourth characterization if the fifth characterization confirms that the fourth characterization accurately describes the skill level of the first individual in the specified skill.

12. The computer-implemented method of claim 11, wherein the first characterization is a function of: (i) the fourth characterization and (ii) the fifth characterization, if the fifth characterization indicates that the fourth characterization does not accurately describe the skill level of the first individual in the specified skill, in which case the first characterization, the fourth characterization, and the fifth characterization are distinct;

wherein the computer-implemented method further comprises, upon receiving, from the second individual, an indication that the second individual declines to characterize the skill level of the first individual, refraining from requesting the second individual to characterize the skill level of the first individual, for at least a predetermined period of time, wherein the computer-implemented method is to determine individuals having target skills, based on automatic and iterative skill refinement via user polling.

13. A system to determine individuals having target skills, the system comprising:

one or more computer processors;

at least one memory, the at least one memory containing a program executable by the one or more computer processors, the program including:

a semantic layer configured to receive a query from a source, the query seeking names of individuals having a target skill set including one or more skills;

a knowledge management system (KMS) layer configured to represent a body of knowledge including information pertaining to a first individual in the target skill set, wherein the information includes a first characterization of a skill level of the first individual in the target skill set, wherein the first characterization is determined based on input from a plurality of individuals, wherein the query is composed according to a query language not supported by the first layer, wherein the query is reformulated into a different query language supported by the first layer; and a collaboration layer configured to, upon determining that a count of the plurality of individuals is less than a predefined count of individuals characterizing the skill level of the first individual, confirm the skill level of the first individual by disseminating the query to at least a second individual in a social network for soliciting responses to the query and for verification of the responses, wherein the second individual is not included in the plurality of individuals.

14. The system of claim 13, wherein the semantic layer includes an Artificial Intelligence (AI) engine configured to modify the received query into a predetermined structure, wherein disseminating the query comprises:

receiving, from the second individual, input responsive to requesting the second individual to provide a second characterization of the skill level of the first individual in the target skill set; and upon programmatically determining that the second characterization confirms the first characterization of the skill level of the first individual in the target skill set, generating output identifying the first individual and specifying the confirmed first characterization of the skill level of the first individual in the specified skill, wherein the output is returned to the source.

15. The system of claim 14, wherein the semantic layer is configured to reformulate the query into a representation that conforms to the representation of knowledge in the KMS layer.

16. The system of claim 15, wherein the semantic layer is configured to send the reformulated query back to the source to verify that the reformulated query is an accurate representation of the query.

17. The system of claim 15, wherein the collaboration layer is configured to formulate a new query and send the new query to the social network to verify information received in response to the query.

18. A computer program product to determine individuals having target skills, the computer program product comprising:
a computer-readable storage medium having computer-readable program code embodied therewith, the computer-readable program code executable by one or more computer processors to:
receive, by an application and from a requesting entity, a request to identify individuals having a target skill specified in the request, wherein the application includes a first layer representing a body of knowledge in a data store, wherein the request comprises a query composed according to a query language not supported by the first layer;
reformulate the query into a different query language supported by the first layer;
identify, by accessing the data store using the reformulated query: (i) a first individual having the specified skill and (ii) a first characterization of a skill level of the first individual in the specified skill, wherein the first characterization is stored in the data store and is determined based on input from a plurality of individuals; and
upon determining that a count of the plurality of individuals is less than a predefined count of individuals characterizing the skill level of the first individual, confirm the skill level of the first individual by requesting at least a second individual to provide a second characterization of the skill level of the first individual in the specified skill, wherein the second individual is not included in the plurality of individuals.

19. The computer program product of claim 18, wherein the computer-readable program code is configured to use a knowledge management system (KMS) to identify names of individuals in a database having the target skill, wherein the computer-readable program code is further executable to:
upon programmatically determining that the second characterization confirms the first characterization of the skill level of the first individual in the specified skill, generate output identifying the first individual and specifying the confirmed first characterization of the skill level of the first individual in the specified skill, wherein the output is returned to the requesting entity responsive to the request.

20. The computer program product of claim 18, wherein the query is reformulated by a semantic software component including an Artificial Intelligence (AI) engine, into a reformulated query having a predetermined syntax.

* * * * *